Figure 1:
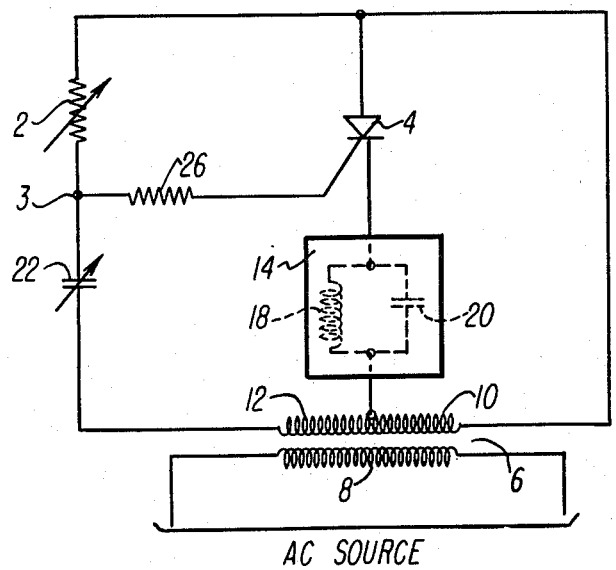

Dec. 3, 1963 H. E. ROBB, JR 3,113,249
TEMPERATURE SENSITIVE PROPORTIONAL CIRCUIT
Filed Aug. 24, 1960

INVENTOR.
Harold E. Robb, Jr.
BY
Byron Hume Groen & Clement
Attys.

United States Patent Office 3,113,249
Patented Dec. 3, 1963

3,113,249
TEMPERATURE SENSITIVE PROPORTIONAL CIRCUIT
Harold E. Robb, Jr., Elk Grove Village, Ill., assignor to The Powers Regulator Company, Skokie, Ill., a corporation of Illinois
Filed Aug. 24, 1960, Ser. No. 51,601
1 Claim. (Cl. 317—132)

This invention relates in general to a temperature sensitive control circuit and in particular to a temperature sensitive control circuit wherein the average output current signal is substantially directly proportional to the change in temperature.

There has been an ever present need in industry for reliable and accurate temperature indication and control systems. To satisfy this need temperature indication and control circuits have been devised which do an adequate job of indicating and controlling temperatures but which are exceedingly complicated and, therefore, are objectionable from the cost and maintenance standpoint. Fairly simple circuits have also been devised for indicating and controlling temperature but these circuits lack reliability and power handling capacity. Many of these circuit arrangements do not provide a linear output with respect to input and, therefore, are limited in their application. In reviewing these and other problems it is apparent that there is much room for improvement in the provision of temperature sensitive control circuits and in accordance therewith the applicant has directed his attention.

It is an object of this invention to provide a temperature control circuit which comprises few parts and is of very simple construction and which is comprised of parts which are inexpensive and readily obtainable on the market.

It is another object of this invention to provide a temperature control circuit wherein the average output current is proportional to the change in temperature in the environment to be controlled.

It is further an object of this invention to provide a temperature control circuit which is capable of providing a large output current so as to be suitable for use in systems having large electrical energy handling capacities.

It is a further object of this invention to provide a temperature control circuit which may be utilized to control the temperature of a system employing apparatus such as electric furnaces and ovens and which at the same time produces a very accurate indication of the variation in temperature so as to be capable of driving a recording element.

It is a further object of this invention to provide a temperature control circuit which provides an average output current which is substantially directly proportional to the change in temperature.

Briefly what has been provided is a control circuit comprising a silicon controlled rectifier utilized in a phase shifting circuit wherein the period of conduction of the silicon controlled rectifier is determined by a selected temperature sensitive element such as a thermistor. The control circuit is adapted such that the output of the control circuit provides a control signal having a direct current component which is directly proportional to the change in temperature as determined by the temperature sensitive thermistor.

Figure 2:
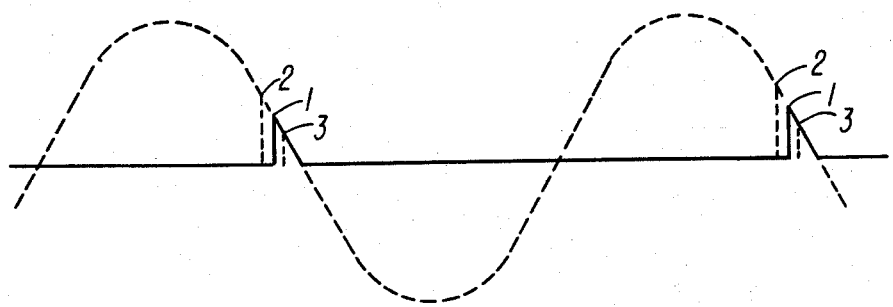

The invention, including the objects and features thereof, will be more readily understood if the following is viewed in light of the drawings of which:

FIGURE 1 is a schematic diagram illustrating one embodiment of the invention;

FIGURE 2 illustrated the output wave form provided by the embodiment of the invention illustrated in FIGURE 1.

Referring now to the drawings in FIGURE 1, there is schematically illustrated a silicon controlled rectifier 4. A silicon controlled rectifier is a three junction semiconductor device which may be utilized in power control and power switching applications and which is capable of handling large load currents. The silicon controlled rectifier presents essentially an open circuit when negative anode to cathode voltage is applied thereto. The forward characteristics of a silicon controlled rectifier are such that it will block positive anode to cathode voltages below a critical threshold voltage if no signal is applied to the gate terminal. However, as soon as the threshold voltage signal is applied to the anode to cathode circuit or an appropriate gate signal is applied to the device it will rapidly switch to a conducting state and will present a low forward voltage drop. Silicon controlled rectifiers are presently on the market and the specific characteristics thereof are readily obtainable. Silicon controlled rectifiers are capable of handling high currents well out of the range of normal semiconductor rectifiers.

The silicon controlled rectifier 4 is inserted in a phase shifting circuit comprising transformer 6, the primary winding 8 of which may be connected to an alternating current source such as, for example, a normal 110 or a 220 volt power line. Transformer 6 is provided with a center tapped secondary winding comprising windings 10 and 12, respectively. The center tap line of the secondary of transformer 6 is connected to the load impedance 14 as illustrated in the drawings.

The load impedance 14 may comprise, for example and as illustrated in dotted lines, a transducer coil 18 such as a solenoid of a valve when the invention is utilized to control steam pressure of a boiler or the gas pressure of a gas furnace or the like. Capacitor 20 is a bypass capacitor and functions to shunt alternating current components of the output wave across the transducer coil 18. The load impedance 14, however, may be a resistance element when the invention is utilized to directly control the power which is transmitted to an electric furnace or oven or the like. The bypass capacitor 20 may also be utilized to shunt the alternating current components of the output current across the resistance element.

Connected to one end of the secondary winding 12 of the transformer 6 is capacitor 22. Capacitor 22 is further connected to the gate electrode of the silicon controlled rectifier 4 through resistor 26. Capacitor 22 is also connected to one terminal of thermistor 2 at junction 3. Thermistor 2 is further connected to the anode of the silicon controlled rectifier 4. The cathode of the silicon controlled rectifier 4 is connected to the load impedance 14 and the anode of the silicon controlled rectifier 4 is also connected to one end of the secondary winding 10 of the transformer 6.

Thermistor 2 is a temperature sensitive element in that the resistance of thermistor 2 varies with the temperature of the environment in which the thermistor 2 is located. An increase in temperature in the environment in which thermistor 2 is located will normally decrease the resistance of the thermistor 2 and a decrease in temperature in the environment will normally increase the resistance of the thermistor 2. Thermistors are usually considered to be non-linear devices in that the change in resistance is not directly proportional to the change in temperature. However, this is the overall characteristic of thermistors and there exists ranges of temperature in which properly selected thermistors respond substantially linearly to the change in temperature and it is within these ranges that the thermistor 2 is operated when utilized in the disclosed invention.

The operation of circuit is as follows: The voltages appearing across the center tapped secondary windings 10 and 12 of the transformer 6 are alike in phase and equal in magnitude. The voltage appearing across the secondary winding 10 supplies a current to the load impedance 14 through the silicon controlled rectifier 4. The gate voltage of the silicon controlled rectifier 4 is supplied from the output of the secondary winding 12 of the transformer 6 and it is applied from the junction 3 of the thermistor 2 and the capacitor 22 through the resistance 26 to the gate electrode of the silicon controlled rectifier 4. Phase shift of the voltage supplied to the gate electrode of the silicon controlled rectifier 4 is varied by a variation of the magnitude of either the resistance of thermistor 2 or the capacitance of the capacitor 22. Ideally, variation of either the resistance of the thermistor 2 of the capacitance of capacitor 22 results in a variation of the phase angle of the voltage applied to the gate of the silicon controlled rectifier 4 but the magnitude of the voltage applied to the gate of the silicon controlled rectifier 4 does not vary. This unusual occurrence has been explained in the literature and specifically in the publication entitled: "Applied Electronics" by Truman Grey, published by Wiley and Sons, Inc., 1955, pages 378 through 382.

The period of conduction of the silicon controlled rectifier 4 is determined by the relative phase angle between the voltage appearing across the anode, cathode electrodes of the rectifier 4 and the voltage appearing at the gate electrode of the rectifier 4. The phase angle between these voltages may be varied by varying the resistance of thermistor 2 or the capacitance of capacitor 22. In the preferred embodiment of the invention the phase angle is adjusted to be large, over 270°, so as to provide an output average current that is substantially directly proportional to the change in temperature of the environment wherein the thermistor 2 is located.

If the resistance of the thermistor 2 remains constant and the capacitance of the capacitor 22 is increased, the conduction angle of the silicon controlled rectifier 4 decreases. If the capacitance of the capacitor 22 is held constant and the resistance of the thermistor 2 increases the phase angle between the voltage applied to the gate of the silicon controlled rectifier 4 and the phase angle of the voltage applied to the anode-cathode electrodes of the silicon controlled rectifier 4 decreases also, thereby increasing the conduction period of the silicon controlled rectifier 4.

In practice the phase shifting circuit described, i.e. where the magnitude of the voltage applied to the gate electrode of the rectifier 4 remains constant and only the phase angle shifts when the magnitude of the resistance of the thermistor 2 is varied or the magnitude of the capacitance of capacitor 22 is varied may not be ideal. However, the ideal circuit may be closely approximated by adjustment of the value of resistor 26. The gate current is negligible when the silicon controlled rectifier 4 is not conducting. However, the much larger gate current during the conduction part of one cycle of the silicon controlled rectifier 4 may cause a transient voltage to persist across the capacitor 22 until conduction of the silicon controlled rectifier 4 starts in the next cycle. During the conduction period the gate current charges the capacitor 22. Therefore, if the magnitude of the resistance of resistor 26 is a large value as compared to the magnitude of the resistance of the thermistor 2, the effect of the gate current will be negligible. However, if the value of the resistance 26 is comparable with the value of the resistance of the thermistor 2, the effect of gate current may be appreciable and the magnitude of the voltage applied to the gate of the silicon controlled rectifier 4 could be controlled by varying or controlling the resistance of the resistor 26.

A direct current output signal may be presented to the load impedance 14 which is substantially directly proportional to the change in temperature of the environment in which the thermistor 2 is located if the circuit arrangement illustrated in the drawings is operated in accordance with the inventive scheme. Initially, a thermistor 2 must be selected which has a linear change in resistance with respect to changes in temperature over the range in which the thermistor 2 is desired to be utilized. Capacitor 22 is selected and adjusted with respect to thermistor 2 such that the angle of conduction of the silicon controlled rectifier 4 will be in a predetermined range such as, for example, at point 1 as illustrated in FIGURE 2.

FIGURE 2 illustrates the wave form of the voltages applied to the silicon controlled rectifier 4 and the load impedance 14. The solid lines portion of FIGURE 2 indicates the period of conduction of the silicon controlled rectifier 4 and the area underneath the solid lines in FIGURE 2 represents the average current delivered to the load impedance 14. The thermistor 2 and the capacitor 22 are adjusted such that the silicon controlled rectifier 4 conducts over that portion of the cycle as illustrated in solid lines in FIGURE 2. It is to be noticed that the operating point which may be point 1, as illustrated in FIGURE 2, and which may be termed the quiescent conducting point, resides within that portion of the sine wave wherein the slope of the sine wave approximates that of a straight line. This is essential to the linear operation of the inventive device inasmuch as the average current or the D.C. current component will be substantially directly proportional to the period of conduction within this area of the sine wave and substantially linear for practical purposes. Therefore, an increase or decrease in the resistance of the thermistor 2 will vary the period of conduction of the silicon controlled rectifier 4 above and below the quiescent point 1 in FIGURE 2 as indicated as points 2 and 3, respectively, of FIGURE 2. The alternating current components of the portion of the wave which is delivered to the load impedance 14 are bypassed with respect to the load impedance 14 by the bypass capacitor 20 and only the direct current component of the output wave form is delivered to the coil 18 of the transducer element.

Therefore, it can be seen that a change in temperature in the environment in which the thermistor 2 is located produces a change in the resistance of the thermistor 2 which is directly proportional to the change in temperature of the environment. The change in the resistance of the thermistor 2 will cause a corresponding change in the phase of the voltage applied to the gate electrode of the silicon controlled rectifier 4 and thereby results in the period of conduction of the rectifier 4 being varied. Inasmuch as only the range of the output wave form which has a slope approximating that of a straight line is utilized in the preferred embodiment, the change in the conduction period of the rectifier 4 is directly proportional to the change in resistance of the thermistor 2 and consequently to the change in temperature of the environment in which the thermistor 2 is located. Therefore, the average current or the direct current component of the output wave form which is delivered to the transducer coil 18 is directly proportional to the change in temperature of the environment in which the thermistor 2 is located.

The aforedescribed temperature sensitive control circuit may be connected, as across load device 14, to a recording mechanism which keeps an accurate and permanent record of the temperature of the environment in which thermistor 2 is located. Also, considerable current may be delivered to load 14 and load 14 may be an electric furnace or oven or a solenoid of a valve or the like.

In summary, what has been described here is a control circuit comprised of very simple and inexpensive components which may be utilized with a power source such as the line voltage and which is inexpensive and which may be readily replaced if on the spot maintenance is not desirable and which provides linear output current directly proportional to the change in temperature of a given environment.

What has been described is what is believed to be the preferred embodiment of the invention and alterations and modifications may be made therein without departing from the scope of the inventive concept which is intended to be covered by the claim appended hereto.

What is claimed is:

A temperature sensitive control circuit for producing an output signal that is directly related to a variation in the temperature of a region at the temperature of interest and that is a substantially linear function of such change in temperature; which control circuit comprises an input transformer having a center tapped secondary winding whereacross dual alternating current input voltages are developed; said secondary winding being arranged so that said dual input voltages are of equal magnitude and of corresponding phase with respect to each other; a variable capacitor and a thermistor connected in series with said center tapped secondary transformer winding so as to form a phase shifting network; said thermistor being adapted to be exposed to the region at the temperature of interest and being selected so that the variation in the resistance of said thermistor in response to variations in the temperature of the region is a substantially linear variation; a silicon controlled semiconductor rectifier including an anode, a cathode and a gate electrode; said anode of said rectifier being electrically connected to one side of said transformer secondary winding; a load network including a parallelly connected transducer coil and a bypass capacitor; said load network being connected in series with and between said cathode of said rectifier and the center tap of said transformer secondary winding so that one of said dual input voltages is applied across said serially connected rectifier and load network and current is supplied to said load network through said rectifier when in a conductive state; and a resistor connected in series with and between said gate electrode and the connecting junction of said serially connected thermistor and variable capacitor that forms said phase shifting network so that a biasing voltage is applied to said gate electrode by said phase shifting network; said phase shifting network being arranged such that the biasing voltage applied to said gate electrode is out of phase with the voltage applied across said serially connected rectifier and load network and said variable capacitor being adjusted in accordance with the anticipated variation in the resistance of said thermistor element when exposed to the region at the temperature of interest so that said rectifier is rendered conductive only during that portion of each cycle of applied input voltage when the slope of said input signal approaches a straight line; said phase shifting network responding to variations in the resistance of said thermistor so as to effect a variation in the phase of the biasing voltage applied to said gate electrode and a corresponding variation in the period of conduction of said rectifier.

References Cited in the file of this patent

UNITED STATES PATENTS

| | | |
|---|---|---|
| 2,477,511 | Comb | July 26, 1949 |
| 2,957,111 | Schaeve | Oct. 18, 1960 |

OTHER REFERENCES

Hull: "Hot-Cathode Thyratrons," General Electric Review, vol. 32, No. 7, July 1929, pages 390–399.

Squier: "Temperature Control Circuit," Abstract 749,845, 649 O.G. 304–5, Aug. 7, 1951.

Gray: Applied Electronics, published by Wiley and Sons, Inc., 1955, pages 378–382.

"Controlled Rectifier Manual," first edition, by General Electric Co., page 7, copyright Mar. 21, 1960.